July 13, 1937.    W. H. FRANK    2,086,611
ELECTRICAL DISTRIBUTION SYSTEM
Original Filed Dec. 1, 1933

INVENTOR.
William H. Frank
BY Daniel G. Cullen
ATTORNEY.

Patented July 13, 1937

2,086,611

UNITED STATES PATENT OFFICE 2,086,611

ELECTRICAL DISTRIBUTION SYSTEM

William H. Frank, Detroit, Mich., assignor to Bulldog Electric Products Company, Detroit, Mich., a corporation of West Virginia Original application December 1, 1933, Serial No. 700,596. Patent No. 2,025,813, dated December 31, 1935. Divided and this application August 31, 1935, Serial No. 38,340

1 Claim. (Cl. 247—3)

The inventions of this application relate to electrical distribution systems and more particularly to systems of the type comprising a stationary elongated duct and a current lead-off device or trolley which may be moved along the duct to take current therefrom at various points along the latter.

This application is a division of application Serial No. 700,596, filed December 1, 1933 which has matured into Patent No. 2,025,813, December 31, 1935.

The principal object of the present invention is the formation of a duct with sloping rails which automatically center the trolley as it rolls along the duct. The duct so formed will be described in the following specification so as to be readily understandable by those skilled in the art, which specification may be more clearly understood upon reference to the appended drawing.

In this drawing.

Figure 1:
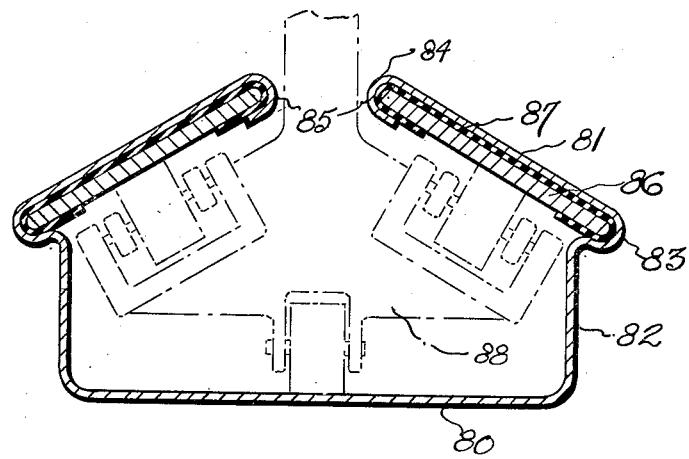
Fig. 1 is a transverse sectional view of a duct shown as provided with one form of trolley therein.
Figure 2:
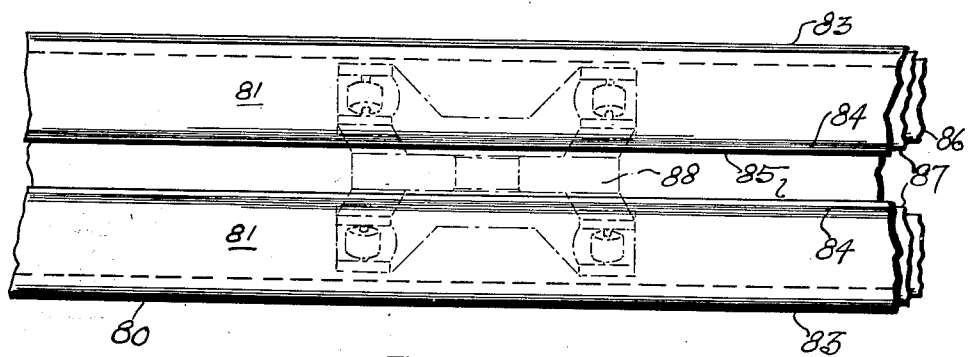
Fig. 2 is a top plan thereof.

In Figs. 1-2 there is shown a duct 80 having two wing portions 81 joined to the side portions 82 by means of beads 83 which, together with the beaded edges 84 of the portion 81, adjacent the run way opening 85, receive the edges of the bus bars 86, these being insulated by insulating strips 87 folded around the bus bars.

It is observed that the wing portions 81 are at an obtuse angle with respect to the side portions 82 rather than at a right angle with respect thereto; by this arrangement the trolley 88 in the duct is automatically centered in the duct and is prevented from lateral shifting therein, as contradistinguished from the construction of application Serial No. 700,596, Figs. 1 to 7. Referring to that construction, it will be seen that the trolley is restrained from moving laterally in the duct only by bumping of trolley parts against duct parts, which bumping is not as desirable as might be; whereas, in the construction hereof, the duct automatically centers the trolley, so that the latter has no tendency to move laterally, and therefore no bumping of trolley parts against duct parts can be possible.

I claim:

In combination with a trolley having three rollers arranged on axes which are at substantial angles to one another, an electrical distribution system comprising a slotted tubular duct of substantially polygonal cross section whose interior surface is formed to provide two separate flat bus rail surfaces closely adjacent to and between which is the slot and along each of which is adapted to ride a contact roller of a trolley, the duct having an interior surface facing the aforementioned interior surfaces and formed to provide a flat rail surface along which rides a third roller of a trolley, the aforementioned flat rail surfaces being at substantial angles with respect to one another, with the relative angularity of the surfaces corresponding to the relative angularity of the axes of the trolley rollers, the construction and arrangement being such that the flat rail surfaces and the trolley rollers have a three point engagement which automatically centers the trolley against movement with respect to the duct in any direction except along the duct.

WILLIAM H. FRANK.